United States Patent Office
2,880,210
Patented Mar. 31, 1959

2,880,210

ACRIDINE N-OXIDES

Edward F. Elslager, St. Clair Shores, and Frank H. Tendick, Grosse Pointe Park, Mich., assignors to Parke, Davis & Company, Detroit, Mich., a corporation of Michigan No Drawing. Application February 20, 1956
Serial No. 566,347

6 Claims. (Cl. 260—279)

This invention relates to a new class of chemical compounds, in particular, acridine 10-oxide compounds and salts thereof which in free base form may be represented by the formula,

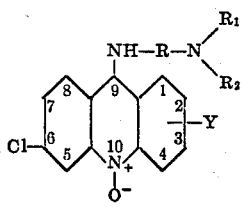

where R is a divalent alkyl or hydroxylalkyl group containing from 2 to 5 carbon atoms inclusive, $R_1$ and $R_2$ designate hydrogen or alkyl or hydroxyalkyl radicals containing from 2 to 8 carbon atoms inclusive, or taken together with —N<, a saturated heterocyclic ring such as a pyrrolidine, piperidine, cyclohexylimine, morpholine or piperazine ring, and Y is a hydrogen, methyl, methoxy, chloro, amino or phenyl radical in the 2- or 3-position.

The above acridine 10-oxide compounds possess significant antibacterial and antiparasitic properties. They are particularly useful in combatting the plasmodia of malaria, intestinal helminths and *Endomoeba histolytica*, the causative agent of amebiasis.

The new acridine 10-oxide compounds may be employed in the form of the free base having the above formula or as the addition salt of an organic or inorganic acid. In general, acid addition salts of any relatively non-toxic organic or inorganic acid are suitable. Some typical examples of these salts are the hydrochloride, hydrobromide, sulphate, phosphate, oxalate, sulfamate, sulfonate, acetate, lactate, tartrate, gluconate, citrate, penicillinate, arsanilate, arsonate, fumagillinate and the like. As examples of preferred salts there may be mentioned the 5,5'-methylene disalicylate, 4,4'-methylene bis-(3-hydroxy-2-naphthoate), methylene di-o-cresotinate, 8-hydroxy-7-iodo-5-quinoline sulfonate, N-acetyl-4-hydroxy-m-arsanilate, N-glycolyl-p-arsanilate, N,N'-ethylene bis-(p-arsanilate), p-ureidobenzenearsonate, benzylpenicillinate, phenoxymethylpenicillinate, fumagillinate and the like. Certain of these salts are particularly useful in that they possess enhanced amebicidal, and in some cases antibacterial properties.

The acridine 10-oxide compounds of the invention are produced by condensing a 9-chloroacridine, 10-oxide having the formula,

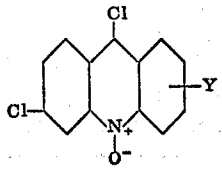

with an aminoalkylamine having in free base form the formula,

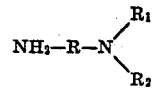

where R, $R_1$, $R_2$ and Y have the aforementioned significance. In carrying out the condensation it is satisfactory to employ substantially equivalent quantities of the reactants in the presence of a suitable organic solvent. Some suitable solvents for this purpose are phenols, aliphatic alcohols such as ethanol, isopropanol, pentanol and octanol, aliphatic ketones such as methyl ethyl ketone and diisobutyl ketone, aliphatic ethers such as dibutyl ether, monoalkyl ethers of ethylene glycol, cyclic ethers such as dioxane and hydrocarbons such as benzene, toluene, and xylene. The preferred solvent is phenol. If desired, an excess of either of the reactants may be employed but it is preferable to employ the monoalkylamine in excess since in many cases it serves as a particularly useful solvent. In general the reaction is favored by temperatures in excess of 75° C. Preferably, the reaction is carried out in the range from about 95 to 140° C. The product can be isolated in free base form or if desired, in acid addition salt form following introduction of a suitable acid. For this purpose hydrochloric acid is preferred although organic acids and other mineral acids can likewise be employed. Salts of the acridine 10-oxides with various acids can be prepared in several ways. For example, the product can be converted to the free base form and the desired salt subsequently prepared by the introduction of the appropriate acid in accordance with methods which are known in the art. Alternatively, salts with mineral acids such as hydrochloric acid can be converted to other desired salts by the introduction of a basic salt of the appropriate acid, such as sodium, potassium, and ammonium salts and the like.

The products of the invention can be prepared by the following illustrative examples.

Example 1

(a) A mixture of 14.8 g. of 6,9-dichloro-2-methoxyacridine, 10-oxide, 45 g. of phenol, and 9 g. of 5-diethylamino-2-aminopentane is stirred and heated on a steam-bath for two hours (protected from moisture by a calcium chloride tube). The resulting dark red liquid is allowed to cool to 50° C. and is slowly poured into a mixture of 1 liter of acetone and 10 ml. of concentrated hydrochloric acid. The yellow precipitate which separates is collected by filtration, washed thoroughly with cold acetone, dried in vacuo and recrystallized from absolute ethanol; M.P. 221–223° C. (dec.). The product, 6-chloro-9-(4-diethylamino-1-methylbutylamino)-2-methoxyacridine, 10-oxide, dihydrochloride, has the formula,

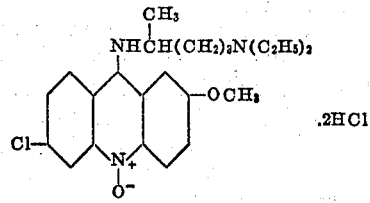

In like manner, the following related compounds can be prepared, starting from 6,9-dichloro-2-methoxyacridine, 10-oxide and an equivalent quantity of the appropriate aminoalkylamine:

6 - chloro - 9 - (3 - diethylaminopropylamino) - 2-methoxyacridine, 10-oxide, dihydrochloride
6 - chloro - 2 - methoxy - 9 - (5 - piperidinopentylamino)-acridine, 10-oxide, dihydrochloride 6 - chloro - 9 - (3 - isopropylaminopropylamino) - 2-methoxyacridine, 10-oxide, dihydrochloride 6 - chloro - 9 - (3 - diethylamino - 2 - hydroxypropylamino)-2-methoxyacridine, 10-oxide, dihydrochloride 6 - chloro - 2 - methoxy - 9 - (3 - pyrrolidinopropylamino)-acridine, 10-oxide, dihydrochloride 2 - [2 - (6 - chloro - 2 - methoxy - 9 - acridinylamino)-ethylamino]ethanol, 10-oxide, dihydrochloride 6 - chloro - 2 - methoxy - 9 - (3 - piperazinopropylamino)-acridine, 10-oxide, trihydrochloride 2 - [3 - (6 - chloro - 2 - methoxy - 9 - acridinylamino)-propylamino]ethanol, 10-oxide, dihydrochloride 6 - chloro - 2 - methoxy - 9 - (3 - morpholinopropylamino)-acridine, 10-oxide, dihydrochloride 6 - chloro - 9 - (3 - cyclohexyliminopropylamino) - 2-methoxyacridine, 10-oxide, dihydrochloride 6 - chloro - 2 - methoxy - 9 - (3 - piperidinopropylamino)-acridine, 10-oxide, dihydrochloride 6 - chloro - 2 - methoxy - 9 (3 - octylaminopropylamino)-acridine, 10-oxide, dihydrochloride 2 - {[4 - (6 - chloro - 2 - methoxy - 9 - acridinylamino)-4-methylbutyl]ethylamino}ethanol, 10-oxide, dihydrochloride The starting material, 6,9-dichloro-2-methoxyacridine, 10-oxide, can be prepared as follows: A solution of 278 g. of 6,9-dichloro-2-methoxyacridine in 5 liters of chloroform is treated at room temperature with a cold solution of 160 g. of perbenzoic acid in 3 liters of chloroform. After standing at room temperature for thirty-six hours, platinum foil is added, and the mixture is concentrated in vacuo to a volume of 1.5 liters and cooled in an ice bath. The precipitate which forms is collected by filtration and washed thoroughly with ether; M.P. 226–228° C. The product thus obtained is 6,9-dichloro-2-methoxyacridine, 10-oxide.

(b) An aqueous solution of 25 g. of 6-chloro-9-(4-diethylamino - 1 - methylbutylamino) - 2 - methoxyacridine, 10-oxide, dihydrochloride, is made alkaline with dilute ammonium hydroxide solution and the resulting alkaline mixture is extracted with chloroform. The chloroform extracts are thoroughly washed with water, dried over anhydrous potassium carbonate and evaporated to dryness; M.P., 147° C. after recrystallization from ethanol-chloroform mixture. The product, 6-chloro-9-(4 - diethylamino - 1 - methylbutylamino) - 2 - methoxyacridine, 10-oxide, monohydrate, has the formula,

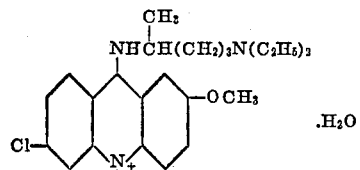

*Example 2*

A hot solution of 8.3 g. of 6-chloro-9-(4-diethylamino-1-methylbutylamino)-2-methoxyacridine, 10-oxide in 25 ml. of ethanol is added to a hot solution of 12.6 g. of N-glycolyl-p-arsanilic acid (12.5% water content) in 150 ml. of 80% ethanol. The solution is heated in a steam-bath for ten minutes, filtered, and the solvent removed in vacuo. Trituration of the residue with several portions of ether-acetone mixture yields 6-chloro-9-(4 - diethylamino - 1 - methylbutylamino) - 2 - methoxyacridine, 10-oxide, bis-(N-glycolyl-p-arsanilic acid) salt. This product has the formula,

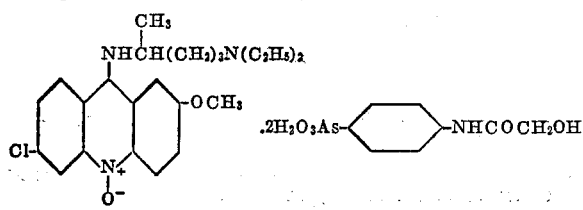

In like manner, salts of 6-chloro-9-(4-diethylamino-1-methylbutylamino) - 2 - methoxyacridine, 10 - oxide with other acids can be prepared. By way of illustration, salts can be prepared starting from the free base and one or two equivalents of the following acids (in the presence of the following solvents):

Fumagillin (acetone)
Sulfuric acid (ether)
Hydrobromic acid (ethanol)
Acetic acid (acetone)
Phosphoric acid (ethanol)

*Example 3*

A hot, filtered solution of 9.8 g. of 6-chloro-9-(4-diethylamino - 1 - methylbutylamino) - 2 - methoxyacridine, 10-oxide, dihydrochloride, in 100 ml. of water is added slowly with stirring to a hot, filtered solution of 15.5 g. of sodium 8-hydroxy-7-iodo-5-quinolinesulfonate in 500 ml. of water. Upon cooling, the product is collected by filtration, washed thoroughly with water, and dried in vacuo to give 6-chloro-9-(4-diethylamino-1-methylbutylamino) - methoxyacridine, 10 - oxide, bis-(8 - hydroxy-7-iodo-5-quinolinesulfonic acid) salt, of formula,

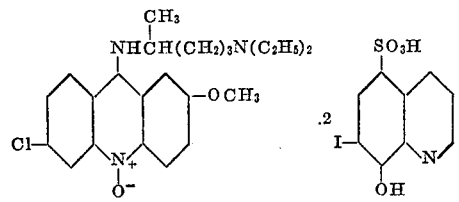

In like manner salts of 6-chloro-9-(4-diethylamino-1-methylbutylamino) - 2 - methoxyacridine, 10 - oxide with other acids can be prepared. By way of illustration salts can be prepared starting from the mono- or dihydrochloride salt and one or two equivalents, respectively of the following alkali metal salts:

Benzyl penicillin, potassium salt
Phenoxymethyl penicillin, potassium salt
p-Ureidobenzenearsonic acid, monosodium salt
N-acetyl-4-hydroxy-m-arsanilic acid, monosodium salt
N,N'-ethylene bis-(p-arsanilic acid), disodium salt

*Example 4*

A mixture of 15 g. of 6,9-dichloro-2-methoxyacridine, 10-oxide, 45 g. of phenol and 9.5 g. of 1-ethylpentylaminopropylamine is heated and stirred on a steam-bath for two hours, the reaction mixture is cooled to 50° C. and poured into a mixture of 10 ml. of concentrated hydrochloric acid and 750 ml. of acetone. The yellow solid which precipitates is collected by filtration, washed with cold acetone and dried in vacuo: M.P. 217–220° C. after recrystallization from 95% ethanol. The product, 6-chloro-9-[3-(1-ethylpentylamino)propylamino]-2-methoxyacridine, 10-oxide, dihydrochloride, has the formula,

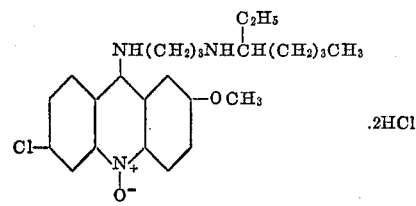

The starting material, 3-(1-ethylpentylamino)propylamine, can be prepared in the following manner: 61 g. of 3-bromoheptane is added over a period of forty minutes with stirring to 100 g. of 1,3-diaminopropane at 125° C. The mixture is heated at reflux temperature for four hours, and is cooled and mixed with a solution of 16 g. of sodium hydroxide in 25 ml. of water. The alkaline mixture is extracted with ether and the extract is dried and the solvent removed in vacuo. 3-(1-ethylpentylamino)propylamine, $n_D^{22}$ 1.4481, is obtained by distilling the residue in vacuo.

Example 5

20.9 grams of 3,6,9-trichloroacridine, 10-oxide are added to a mixture of 11.1 g. of 5-diethylamino-2-aminopentane and 45 g. of phenol. The reaction mixture is stirred and heated at 110–115° C. for two hours and is then cooled and slowly poured into a mixture of 300 ml. of acetone and 10 ml. of concentrated hydrochloric acid. The mixture is diluted to a volume of 1 liter by the addition of an acetone-ether mixture, and the precipitate which forms is collected by filtration and recrystallized from methanol-acetone mixture; M.P. 216–218° C. (dec.). The product, 3,6-dichloro-9-(4-diethylamino-1-methylbutylamino)acridine, 10-oxide, dihydrochloride, hemihydrate, has the formula,

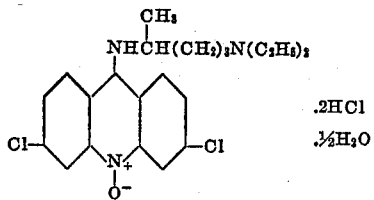

In like manner the following related compounds can be prepared, starting from 3,6,9-trichloroacridine, 10-oxide and an equivalent quantity of the appropriate aminoalkylamine:

3,6-dichloro-9-(3-diethylaminopropylamino)acridine, 10-oxide, dihydrochloride 3,6-dichloro-9-(5-piperidinopentylamino)acridine, 10-oxide, dihydrochloride 3,6-dichloro - 9 - (3-isopropylaminopropylamino)acridine, 10-oxide, dihydrochloride 3,6 - dichloro-9-(3-diethylamino-2-hydroxypropylamino)-acridine, 10-oxide, dihydrochloride 3,6 - dichloro - 9 - [3-(1-ethylpentylamino)propylamino]-acridine, 10-oxide, dihydrochloride 3,6 - dichloro-9-(3-pyrrolidinopropylamino)acridine, 10-oxide, dihydrochloride 2-[2-(3,6-dichloro - 9 - acridinylamino)ethylamino]-ethanol, 10-oxide, dihydrochloride 3,6-dichloro-9-(3-piperazinopropylamino)acridine, 10-oxide, trihydrochloride 2-[3-(3,6-dichloro-9-acridinylamino)propylamino] - ethanol, 10-oxide, dihydrochloride 3,6 - dichloro-9-(3-morpholinopropylamino)acridine, 10-oxide, dihydrochloride 3,6-dichloro-9-(3-cyclohexyliminopropylamino)-acridine, 10-oxide, dihydrochloride 3,6-dichloro-9-(3-piperidinopropylamino)acridine, 10-oxide, dihydrochloride 2,2'-[3-(3,6-dichloro - 9 - acridinylamino)propylimino]diethanol, 10-oxide, dihydrochloride 3,6-dichloro - 9 - (3-octylaminopropylamino)acridine, 10-oxide, dihydrochloride The 3,6,9-trichloroacridine, 10-oxide, M.P. 236–238° C., employed as a starting material for the above procedure, can be prepared from 3,6,9-trichloroacridine and perbenzoic acid in accordance with the method set forth under Example 1 herein for the preparation of 6,9-dichloro-2-methoxyacridine, 10-oxide.

Example 6

A mixture of 6.8 g. of 3,9-dichloroacridine, 10-oxide, 25 g. of phenol, and 4 g. of 5-diethylamino-2-aminopentane is heated in a metal bath at 125–135° C. for two hours. The reaction mixture is cooled, and poured slowly into acetone which has been made strongly acid to Congo red by the addition of concentrated hydrochloric acid. A portion of the acetone is evaporated, and the residue diluted with several volumes of anhydrous ether. The ether is decanted from the oily precipitate which separates, and the residue triturated with several fresh portions of anhydrous ether. The waxy product which results is dissolved in water, the water solution treated with decolorizing charcoal, filtered, made alkaline with ammonium hydroxide and extracted with chloroform. The chloroform extract is washed with water, filtered, and evaporated to dryness. The residue is dissolved in ethanol, and the solution treated with excess alcoholic hydrogen chloride. The solution is evaporated to a small volume, and acetone-ether mixture is added. The product, 3 - chloro - 9 - (4-diethylamino-1-methylbutylamino)-acridine, 10-oxide, dihydrochloride, separates in the form of yellow crystals and is collected; M.P. 192° C. (dec.). This product has the formula,

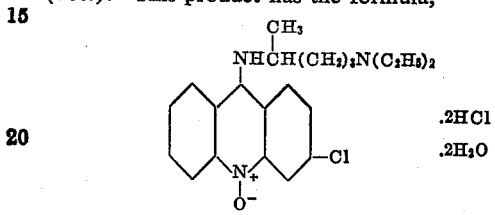

In like manner, the following related compounds can be prepared, starting from 3,9-dichloroacridine, 10-oxide and an equivalent quantity of the appropriate aminoalkylamine:

3 - chloro - 9 - (3 - diethylaminoproplamino)acridine, 10-oxide, dihydrochloride 3 - chloro - 9 - (5 - piperidinopentylamino)acridine, 10-oxide, dihydrochloride 2 - {[4 - (3 - chloro - 9 - acridinylamino) - 4 - methylbutyl]ethylamino}ethanol, 10 - oxide, dihydrochloride 3 - chloro - 9 - (3 - isopropylaminopropylamino)-acridine, 10-oxide, dihydrochloride 3 - chloro - 9 - (3 - diethylamino - 2 - hydroxypropylamino)acridine, 10-oxide, dihydrochloride 3 - chloro - 9 - (3 - pyrrolidinopropylamino)acridine, 10-oxide, dihydrochloride 3 - chloro - 9 - (3 - octylaminopropylamino)acridine, 10-oxide, dihydrochloride 2 - [2 - (3 - chloro - 9 - acridylamino)ethylamino]-ethanol, 10-oxide, dihydrochloride 3 - chloro - 9 - (3 - piperazinopropylamino)acridine, 10-oxide, trihydrochloride 2 - [3 - (3 - chloro - 9 - acridinylamino)propylamino]-ethanol, 10-oxide, dihydrochloride 3 - chloro - 9 - (3 - morpholinopropylamino)acridine, 10-oxide, dihydrochloride 3 - chloro - 9 - (3 - cyclohexyliminopropylamino)-acridine, 10-oxide, dihydrochloride 3 - chloro - 9 - (3 - piperidinopropylamino)acridine, 10-oxide, dihydrochloride The 3,9-dichloroacridine, 10-oxide, M.P. 164–166° C., employed as a starting material for the above procedure, can be prepared from 3,9-dichloroacridine and perbenzoic acid in accordance with the method set forth under Example 1 herein for the preparation of 6,9-dichloro-2-methoxyacridine, 10-oxide.

Example 7

A mixture of 10 g. of 6,9-dichloro-3-nitroacridine, 10-oxide, 10 g. of 3-diethylaminopropylamine and 50 g. of phenol is heated at 120° C. for two hours. The mixture is poured into an excess of 2 N sodium hydroxide solution, whereupon a dark precipitate is formed. This product, 6 - chloro - 9 - (3 - diethylaminopropylamino)-3-nitroacridine, 10-oxide, is collected and suspended in 150 ml. of glacial acetic acid, and treated with 28.5 g. of anhydrous stannous chloride in 150 ml. of glacial acetic acid at room temperature. After one-half hour, the precipitate which separates is collected by filtration and decomposed with 10 N sodium hydroxide. The product is extracted with ethyl acetate, and the solvent evaporated in vacuo to give 3-amino-6-chloro-9-(3-diethylaminopropylamino)acridine, 10-oxide monohydrate, which has the formula,

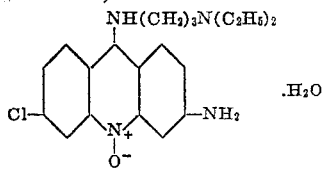

In like manner, the following related compounds can be prepared, starting with 6,9-dichloro-3-nitroacridine, 10-oxide and from one to two equivalents of the appropriate aminoalkylamine:

3 - amino - 6 - chloro - 9 - (4 - diethylamino - 1 - methylbutylamino)acridine, 10-oxide 3 - amino - 6 - chloro - 9 - (5 - piperidinopentylamino)- acridine, 10-oxide 3 - amino - 6 - chloro - 9 - (3 - isopropylaminopropylamino)acridine, 10-oxide 3 - amino - 6 - chloro - 9 - (3 - piperidinopropylamino)- acridine, 10-oxide 2 - {[4 - (3 - amino - 6 - chloro - 9 - acridinylamino)- 4-methylbutyl]ethylamino}ethanol, 10-oxide The starting material, 6,9-dichloro-3-nitroacridine, 10-oxide, can be prepared from 2,4-dichlorobenzoic acid and m-nitroaniline in accordance with the procedure described under Example 8 hereinafter for the preparation of 3,9-dichloro-6-methylacridine, 10-oxide.

*Example 8*

A mixture of 13.9 g. of 3,9-dichloro-6-methylacridine, 10-oxide, 50 g. of phenol and 8.7 g. of 5-diethylamino-2-aminopentane is stirred and heated on the steam-bath for two hours. The dark red reaction mixture is allowed to cool to 40° C. and is slowly poured into a mixture of 1 liter of acetone and 10 ml. of concentrated hydrochloric acid. The yellow precipitate which separates is collected by filtration, washed thoroughly with ether, dried in vacuo, and recrystallized from ethanol. The product, 6 - chloro - 9 - (4 - diethylamino - 1 - methylbutylamino)- 3-methylacridine, 10-oxide, dihydrochloride, has the formula,

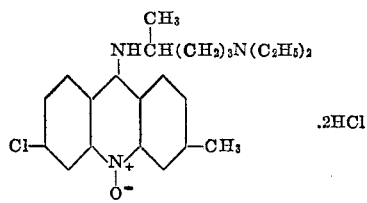

In like manner, the following related compounds can be prepared, starting from 3,9-dichloro-6-methylacridine, 10-oxide and an equivalent quantity of the appropriate aminoalkylamine:

6 - chloro - 9 - (3 - diethylaminopropylamino) - 3- methylacridine, 10-oxide, dihydrochloride 6 - chloro - 3 - methyl - 9 - (5 - piperidinopentylamino)- acridine, 10-oxide, dihydrochloride 6 - chloro - 9 - (3 - isopropylaminopropylamino) - 3- methylacridine, 10-oxide, dihydrochloride 6 - chloro - 3 - methyl - 9 - (3 - piperidinopropylamino)- acridine, 10-oxide, dihydrochloride 2 - {[4 - (6 - chloro - 3 - methyl - 9 - acridinylamino)- 4 - methylbutyl]ethylamino}ethanol, 10-oxide, dihydrochloride 6 - chloro - 3 - methyl - 9 - (octylaminopropylamino)- acridine, 10-oxide, dihydrochloride 3,9-dichloro-6-methylacridine, 10-oxide, employed as a starting material for the above procedure can be prepared as follows: 191 g. of 2,4-dichlorobenzoic acid, 134 g. of m-toluidine, 138 g. of anhydrous potassium carbonate, 5 g. of copper powder and 750 ml. of dry n-amyl alcohol are stirred and heated under reflux for five hours. The mixture is cooled, treated with 70 g. of potassium hydroxide in 100 ml. of water, and steam distilled. The aqueous residue is filtered hot, made slightly acid with concentrated hydrochloric acid, and cooled. The precipitated acid is collected by filtration, washed with water, and then with petroleum ether (B.P. 30–60° C.). The filter cake is boiled with 300 ml. of ethanol, chilled, collected on a filter, and washed with petroleum ether (B.P. 30–60° C.). Recrystallization from a monochlorobenzene-ligroin (B.P. 60–80° C.) mixture (charcoal) yields 4-chloro-N-(m-tolyl)anthranilic acid, M.P. 197–199° C., as almost colorless needles. A mixture of 64 g. of this acid and 200 ml. of phosphorus oxychloride is warmed gently until the exothermic reaction subsides; it is subsequently heated under reflux for two hours. A portion of the excess phosphorus oxychloride is removed in vacuo, the residue is dissolved in dry chloroform, and the chloroform solution is slowly poured with stirring into an excess of ammonium hydroxide solution and ice. A second portion of chloroform is added and the combined chloroform solutions are dried over anhydrous potassium carbonate. The chloroform is removed in vacuo, and the residue fractionally crystallized from benzene and acetone to yield 3,9-dichloro-6-methylacridine, M.P. 206° C. This product is then allowed to react with perbenzoic acid in accordance with the analogous method set forth under Example 1 herein for the preparation of 6,9-dichloro-2-methoxyacridine, 10-oxide; the resulting product is 3,9-dichloro-6-methylacridine, 10-oxide, M.P. 172–174° C.

*Example 9*

A mixture of 15 g. of 6,9-dichloro-2-phenylacridine, 10-oxide and 30 g. of 5-diethylamino-2-aminopentane is heated at 120–140° C. for three hours with mechanical stirring. Upon cooling, the mixture is poured into an excess of sodium hydroxide solution. The resulting mixture is extracted thoroughly with ether, the ether extracts are washed with water and dried over anhydrous potassium carbonate. Anhydrous hydrogen chloride is bubbled into the ether solution, and the product which precipitates is collected by filtration, dried in vacuo, and recrystallized from ethanol-acetone mixture. The product, 6 - chloro-9-(4-diethylamino-1-methylbutylamino)-2- phenylacridine, 10-oxide, dihydrochloride, has the formula,

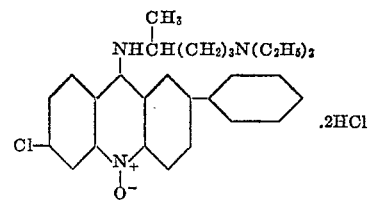

In like manner, the following related compounds can be prepared, starting from 6,9-dichloro-2-phenylacridine, 10-oxide and at least one equivalent of the appropriate aminoalkylamine:

6 - chloro - 9 - (3 - diethylaminopropyl) - 2 - phenylacridine, 10-oxide, dihydrochloride 6 - chloro - 2 - phenyl - 9 - (5 - piperidinopentylamino)- acridine, 10-oxide, dihydrochloride 6 - chloro - 9 - (3 - octylaminopropylamino) - 2 - phenylacridine, 10-oxide, dihydrochloride 6 - chloro - 9 - (3 - isopropylaminopropylamino) - 2 - phenylacridine, 10-oxide, dihydrochloride 6 - chloro - 2 - phenyl - 9 - (3 - piperidinopropylamino)- acridine, 10-oxide, dihydrochloride 2 - {[4 - (6 - chloro - 2 - phenyl - 9 - acridinylamino)- 4-methylbutyl]ethylamino}ethanol, 10-oxide, dihydrochloride 6,9-dichloro-2-phenylacridine, 10-oxide, employed as a starting material for the above procedure, can be prepared as follows: A mixture of 111.5 g. of 4-aminodiphenyl, 114.6 g. of 2,4-dichlorobenzoic acid, 82.8 g. of anhydrous potassium carbonate, 3 g. of copper powder and 800 ml. of dry n-amyl alcohol is heated under reflux for six hours with mechanical stirring. Water is removed through a Dean-Stark water trap as the reaction progresses. A solution of 70 g. of potassium hydroxide in 100 ml. of water is added, and the mixture is steam distilled, diluted with water and filtered. The crude acid is precipitated with dilute hydrochloric acid, collected by filtration and washed thoroughly with water. The wet filter cake is digested with 1.5 liters of boiling ethanol, the mixture cooled, filtered and the filter cake washed with petroleum ether (B.P. 30–60° C.) and dried. The product, 4-chloro-N-(4-diphenyl) anthranilic acid, is recrystallized from monochlorobenzene; M.P. 246° C. A mixture of 130 g. of 4-chloro-N-(4-diphenyl) anthranilic acid and 400 ml. of phosphorus oxychloride is warmed gently until the exothermic reaction subsides; the mixture is subsequently heated under reflux for two hours and the excess phosphorus oxychloride is removed in vacuo. The residue is dissolved in dry chloroform and is slowly poured with stirring into an excess of ammonium hydroxide solution and ice. A second portion of chloroform is added, and the combined chloroform solutions are dried over anhydrous potassium carbonate. The chloroform is removed in vacuo, and the residual product, 6,9-dichloro-2-phenylacridine, is crystallized from benzene. 6,9-dichloro-2-phenylacridine, 10-oxide, is then prepared from 6,9-dichloro-2-phenylacridine and perbenzoic acid in accordance with the method set forth under Example 1 herein for the preparation of 6,9-dichloro-2-methoxyacridine, 10-oxide.

What is claimed is:

1. A compound of the class consisting of a free base and its non-toxic acid addition salts, said free base having the formula,

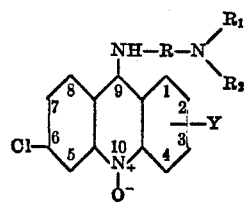

where R is a member of the group consisting of divalent alkyl and hydroxyalkyl containing from 2 to 5 carbon atoms inclusive, $R_1$ and $R_2$ represent members of the class consisting of hydrogen, alkyl and hydroxyalkyl radicals containing from 2 to 8 carbon atoms inclusive and further members wherein $R_1$ and $R_2$ taken together with —N< from a saturated heterocyclic ring of the group consisting of pyrrolidine, piperidine, cyclohexylimine, morpholine and piperazine, and Y is a member of the class consisting of 2-substituted and 3-substituted hydrogen, methyl, methoxy, chloro, amino and phenyl radicals.

2. 6 - chloro - 9 - (4 - diethylamino - 1 - methylbutylamino)-2-methoxyacridine, 10-oxide, hydrochloride.

3. 3,6 - dichloro - 9 - (3 - piperidinopropylamino)acridine, 10-oxide, hydrochloride.

4. 3,6 - dichloro - 9 - (5 - piperidinopentylamino) - acridine, 10-oxide, hydrochloride.

5. 6 - chloro - 2 - methoxy - 9 - (3 - isopropylaminopropylamino)acridine, 10-oxide, hydrochloride.

6. 2 - [3 - (6 - chloro - 2 - methoxy - 9 - acridinylamino)propylamino]ethanol, 10-oxide, hydrochloride.

References Cited in the file of this patent
UNITED STATES PATENTS

| | | |
|---|---|---|
| 2,500,131 | Linsker et al. | Mar. 7, 1950 |
| 2,518,130 | Evans et al. | Aug. 8, 1950 |
| 2,531,012 | Surrey | Nov. 21, 1950 |
| 2,531,013 | Surrey | Nov. 21, 1950 |
| 2,555,944 | Surrey | June 5, 1951 |

OTHER REFERENCES

Linsker et al.: Jour. Am. Chem. Soc., vol. 68, pp. 192–3 (1946).